(12) United States Patent
Henry, Jr. et al.

(10) Patent No.: US 8,660,522 B1
(45) Date of Patent: Feb. 25, 2014

(54) DIRECTING WIRELESS CUSTOMERS TO A NETWORK SERVICE USING AN INCENTIVE

(75) Inventors: Coulter C. Henry, Jr., Marietta, GA (US); Linda S. Giles, Powder Springs, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1346 days.

(21) Appl. No.: 11/771,680

(22) Filed: Jun. 29, 2007

(51) Int. Cl.
*H04M 11/00* (2006.01)

(52) U.S. Cl.
USPC ........ 455/406; 455/453; 455/414.1; 455/450; 455/452.1; 370/252

(58) Field of Classification Search
USPC .................. 455/406, 453, 414.1, 450, 452.1; 370/252
See application file for complete search history.

(56) References Cited

U.S. PATENT DOCUMENTS

| | | | |
|---|---|---|---|
| 5,367,679 A * | 11/1994 | Khaira | 718/103 |
| 5,794,140 A * | 8/1998 | Sawyer | 455/408 |
| 6,577,717 B1 * | 6/2003 | Henon | 379/114.01 |
| 2002/0087682 A1 * | 7/2002 | Roach | 709/224 |
| 2004/0072574 A1 * | 4/2004 | Matz et al. | 455/453 |

\* cited by examiner

*Primary Examiner* — Wayne Cai
*Assistant Examiner* — Chuck Huynh
(74) *Attorney, Agent, or Firm* — Parks IP Law LLC; Mickki D. Murray, Esq.

(57) ABSTRACT

Architecture for offering enticements to cellular customers that will lead the customers to use the available services at times away from peak usage. For example, the provider can offer incentives (or enticements) that direct users to make phone calls during off-peak times of the hour or day. An incentive can include charging customers reduced minutes (e.g., 0.75 minutes) for each minute used from the customer plan when the customer uses services during off-peak time of the day. This applies to text messaging where users can attach files such as images and short video clips for communication to other cellular users, and to cellular devices via which users can access websites. In general, any services supported by the wireless provider can benefit by providing incentives to move users away from times of high network usage during the day.

18 Claims, 9 Drawing Sheets

DIRECTING WIRELESS CUSTOMERS TO A NETWORK SERVICE USING AN INCENTIVE

TECHNICAL FIELD

This invention relates to wireless communication systems, and more specifically, to services offerings to customers.

BACKGROUND

The ubiquitous nature of networks for computing and cellular communications has drawn millions of customers to utilize a variety of continually evolving technologies. While this is generally a benefit to both providers and users alike, in many cases the bandwidth available at any point in time to deliver services to customers fluctuates such that delivery can be impeded. This can have a negative effect on customer experience where customers will leave for a competitor network. Accordingly, providers can expend an enormous amount of resources (in money and personnel) trying to predict swings in the network load in order to maintain a satisfied customer experience.

With the rapid expansion in cellular users and the capability to reach IP services via cellular networks, large wireless companies provide one way in which to even the network load by offering customers free call minutes (e.g., nights and weekends) in an effort to offer unique services to customers. However, directing customers to different times of the day can also have network advantages. At certain times of the day, the network will have increased traffic volumes due to normal use by customers (e.g., during normal work hours). As a result, the network resources have to keep up with traffic capacity. With that, companies are constantly trying to come up with new and inventive ways of maximizing network resources. However, this usually results in large expenditures on the latest upgrades to switches, bandwidth, etc. These costly reactive solutions can account for a large portion of a wireless provider's operating budget.

SUMMARY

The following presents a simplified summary in order to provide a basic understanding of some aspects of the disclosed architecture. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a new mechanism for offering incentives or enticements to wireless (e.g., cellular) customers that will lead or direct the customers to use the available services at alternative times (e.g., away from peak usage times). For example, to mitigate the loading effects on the network due to the rapid growth in customers the provider can offer incentives that direct customers (e.g., industrial, private, etc.) to make phone calls during off-peak times of the hour, day, etc.

One such incentive is a business method of charging customers a fractional minute for each minute used from the customer plan, when the customer accesses the service in the alternative way offered by the incentive. For example, if a provider knows from prior data that 3:30 PM is a high usage time of the day and could save costs associated with company resources (e.g., network bandwidth, personnel, etc.) by shifting much of the call traffic to 4:30 PM, the provider can offer customers factional minutes for minutes used from 4:30 PM to 6:30 PM for all calls made during that time slot. For casual users, this is a more attractive incentive for using off-peak times.

This mechanism can also be applied to other services offered to customers. For example, text messaging is a hot area where users can send not only simple text, but also attach files such as images and short video clips for communication to other cellular users. The disclosed mechanism also applies to cellular devices via which users can access websites, and so on. In general, any services supported by the wireless provider can benefit by providing incentives to move users away from times of high network usage in order to provide an overall reliable and satisfying customer experience while providing better network utilization to the wireless provider.

To the accomplishment of the foregoing and related ends, certain illustrative aspects of the disclosed architecture are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

As required, detailed novel embodiments are disclosed herein. It must be understood that the disclosed embodiments are merely exemplary and may be embodied in various and alternative foams, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the invention. Therefore, specific structural and functional details disclosed herein are not to be interpreted as limiting, but merely as a basis for the claims and as a representative basis for teaching one skilled in the art to variously employ the invention.

The invention is applicable to any existing or yet to be developed wireless telecommunications network such as the global system for mobile communications (GSM) air interface that uses general packet radio service (GPRS) as an enabling bearer. Examples of other suitable wireless and radio frequency data transmission systems include networks utilizing code division multiple access (CDMA), time division multiple access (TDMA), frequency division multiple access (FDMA), wideband code division multiple access (WCDMA), orthogonal frequency division multiplexing (OFDM), wireless fidelity (Wi-Fi), and various other 2.5 and 3G (third generation) and above wireless communications systems. Examples of other suitable enabling bearers include universal mobile telecommunications system (UMTS), enhanced data rates for global evolution (EDGE), high speed downlink/uplink packet access (HSDPA/HSUPA), voice over Internet protocol (VoIP), and similar communications protocols.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
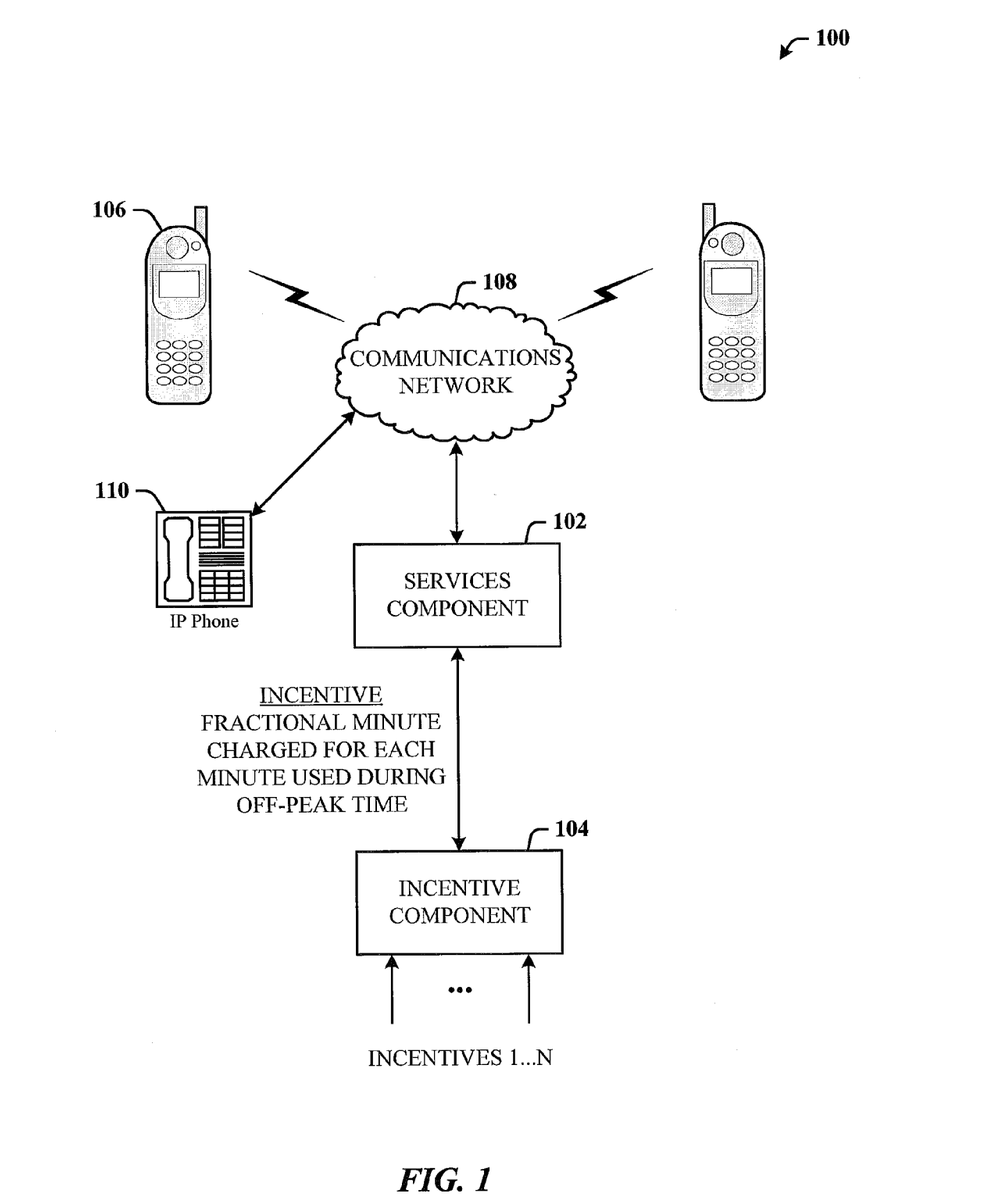
FIG. 1 illustrates a communications services system for offering fractional minutes to move cellular customers away from a time of peak usage.

Referring initially to the drawings, FIG. 1 illustrates a communications services system 100 for offering fractional minutes to move cellular customers away from a time of peak usage. In support thereof, the system 100 includes a services component 102 of a cellular provider for providing services to customers during a time of peak usage, and an incentive component 104 for offering an incentive to the customers that results in charging the customers a fractional minute for each minute of use (also referred to as the fractional-minute incentive) of a service during an off-peak time.

The incentive component 104 can be configured to offer a number of incentives (denoted INCENTIVES 1 . . . N) for any number of different services available from a provider. For example, one service involves voice calls by wireless customers 106 of the wireless provider such that the provider desires to redefine the network load by moving customers of the service from the peak time to off-peak times. Another example includes a service for text messaging which can also affect the network load. The same fractional-minute incentive can be offered to text-messaging users to entice them to move text messaging activity to a different time in view of an increasing load in the communications network 108.

The communications network 108 can include both cellular and IP-based services. Thus, an IP phone 110 can communicate via SIP (session initiation protocol) over the network 108, and be offered the same fractional-minute incentive. In other words, any service offered by a provider that charges according to time usage can benefit from the disclosed architecture by offering a fractional time unit for each full unit normally charged by taking advantage of the offered incentive.

Figure 2:
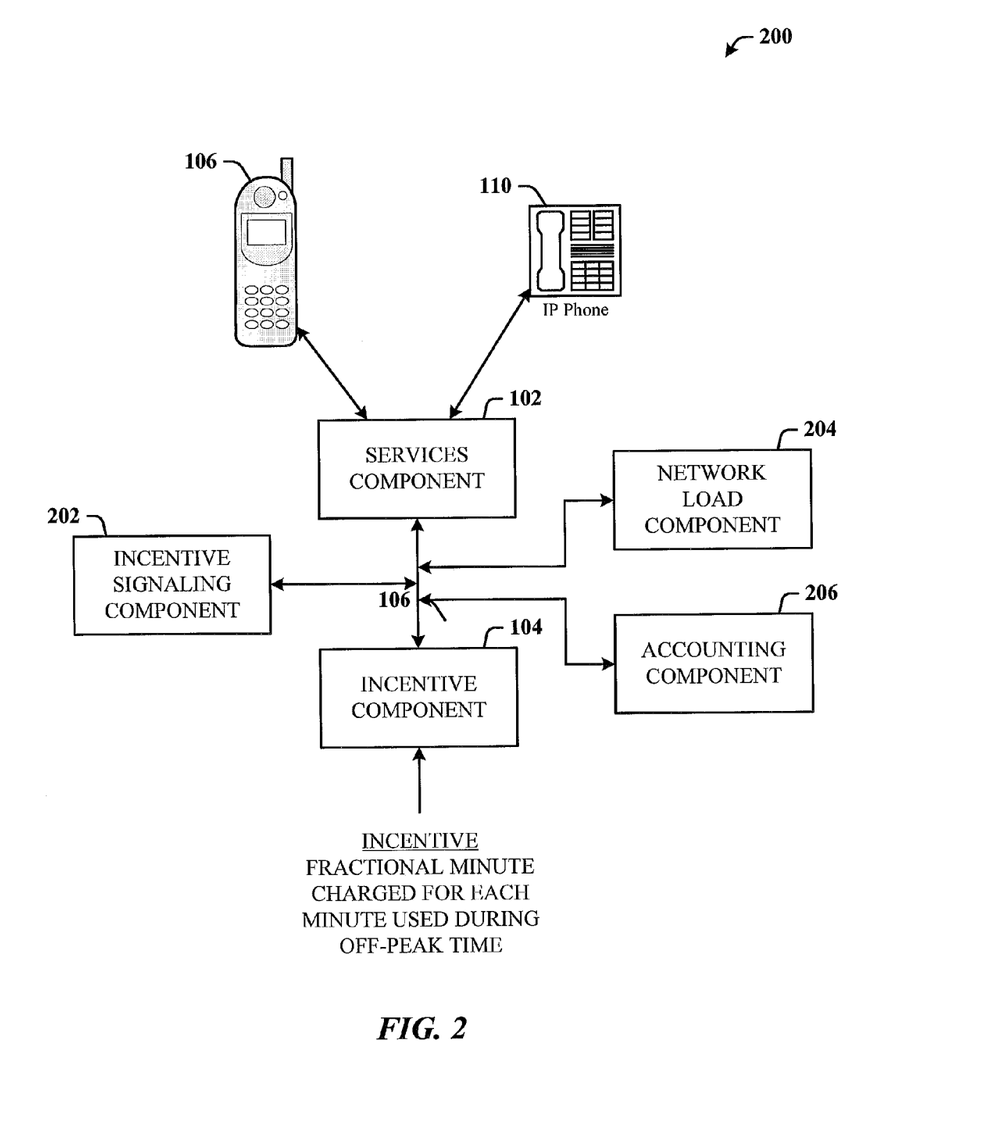
FIG. 2 illustrates an alternative incentive system that includes an incentive signaling component for communicating incentive information to a customer.

FIG. 2 illustrates an alternative incentive system 200 that includes an incentive signaling component 202 for communicating incentive information to a customer. In one implementation, the fractional-minute incentive can be a subscribed-to service such that the services provider knows in advance (based on historical information) when peak usage times generally occur. In another embodiment, the signaling component 202 reacts to information provided by a network load component 204 that tracks network loading in realtime. Accordingly, when an unexpected time of increased service load (or usage) is detected (e.g., or anticipated by computing trends in daily activity), the system 200 can react dynamically to offer the fractional-minutes incentive to customers.

The incentive can be offered to customers currently online (IP-based service) or in a call (voice service), to customers that the provider knows typically will call at the time that the increased service load is detected (or anticipated), and/or even on a regional basis, for example. In other words, the increased service load may be only a temporary regional problem such that the offer can be communicated to user in that region only.

In yet another implementation, the incentive will be offered according to a ranked hierarchy of customer (or preferred customer basis). Customers with the highest level of service ("first tier") will be offered the incentive first, followed by customers with a lower level of service (e.g., "second tier"), and then followed by roamers, and so on, for example. The order or ranking can be adjusted in any way desired by the provider.

If the incentive is not selected by a sufficient number of customers in the first tier, which the provider can compute by responses from the customers who indicated that they would accept the incentive, then the provider can make the offer to second-tier customers, and so on, until the detected or anticipated service load is reduced to the desired level. As indicated, in one embodiment, the incentive can be a probabilistic estimate as to how many customers will need to be notified to reduce the service load to the desired level. In another exemplary implementation, the contacted customers will be required to respond to the incentive as accepted or rejected, thereby establishing a "gentlemen's agreement" (however, not binding, perhaps) that the customer will access the service only at the specified time.

Customers can subscribe to the fractional-minutes incentive in any number of conventional ways, such as an upfront agreement. Alternatively, as indicated above, the incentive can be provided in a more realtime manner based on dynamic shifts in the network load.

The system 200 can also include an accounting component 206 that tracks minute usage during the off-peak time according to the incentive and charges the customer accordingly. Note that charging is not limited to direct billing charges, but can simply mean that where a user receives free minutes according to a subscriber plan, the minutes are reduced according to the fractional minutes rather than the full minutes. Note that the incentive can also be applied to conferencing subscribers, for example.

Figure 3:
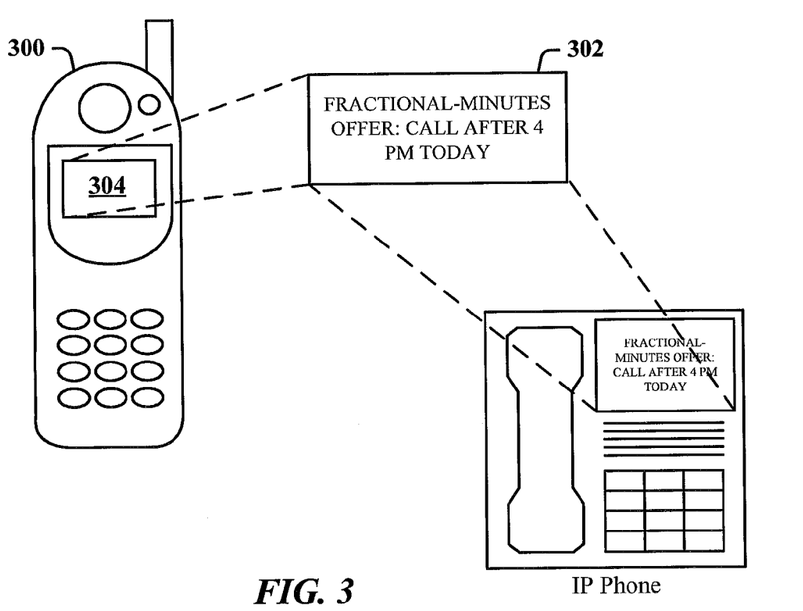
FIG. 3 illustrates exemplary methods of incentive notification that can be communicated to a customer phone by a provider incentive signaling component.

FIG. 3 illustrates exemplary methods of incentive notification that can be communicated to a customer phone 300 by a provider incentive signaling component. One method is to broadcast a notification 302 to a phone display 304 (e.g., cell phone, IP phone) via a text message. Another method is to send an automatic call to the customer phone 300 that when answered can provide the incentive information to the phone user. Yet another method is to send a reminder to the user during a detected (or anticipated) peak service load that the user subscription plan includes the fractional-minutes feature that the user can take advantage of, if desired. Still another method of notification can be by image or video animation attachment for play by the customer phone. These are only but a few techniques that can be utilized to notify a customer of the incentive. Other conventional techniques can include notification by phone e-mail, computer e-mail, facsimile, customer paper billings, etc., via Wi-Fi, BLUETOOTH and other wired and wireless networks.

As indicated in the sample notification 302, the user can be directed to another time of the day to make calls in order to obtain the incentive. In a subscribed-to plan, this can include scheduled times which the customer can obtain the benefit of the offer. Moreover, it is to be understood that groups or categories (e.g., tiers) of customers can each be directed to different time slots of the day. For example, preferred business customers can be directed to obtain the factional-minute benefit to a different time during a workday having normal business hours (e.g., 8 AM-5 PM), rather than "after-hours" time slots (e.g., after 5 PM or before 8 AM).

In yet another implementation, the customer is offered the incentive only for a given period of time. In other words, the reduced rate will be offered "this week only", "to business customers only this week", "only to business customers who call between 4:30 PM and 6 PM today", "only to customers who call in the next 2 hours", "to all customers beginning at 5 PM today", and so on, by placing restriction criteria (e.g., categories of customers) and/or temporal criteria (e.g., begin time, end time, time duration, day, week, etc.) in the incentive.

In yet another example, certain categories of customers can be given notification about the incentive further in advance of other customers. In other words, preferred customers can be sent the incentive notification before other customers are notified. Thus, the preferred customers will be given more time to plan for execution or access of the services during the stipulated time period, whereas less preferred customers will be given less advance notification to react and take advantage of the incentive.

The incentive notification can also be in the form of audio signals, for example, a specific ring tone or audio chirp can be assigned (by the user, provider, etc.) to the incentive such that when the incentive is offered, the user can quickly identifier the notification. Other notification methods can include controlling light features of the phones (blinking light of a button, the display, etc.), vibratory signals, etc., using any of the many ways in which users perceive information from the phone.

Figure 4:
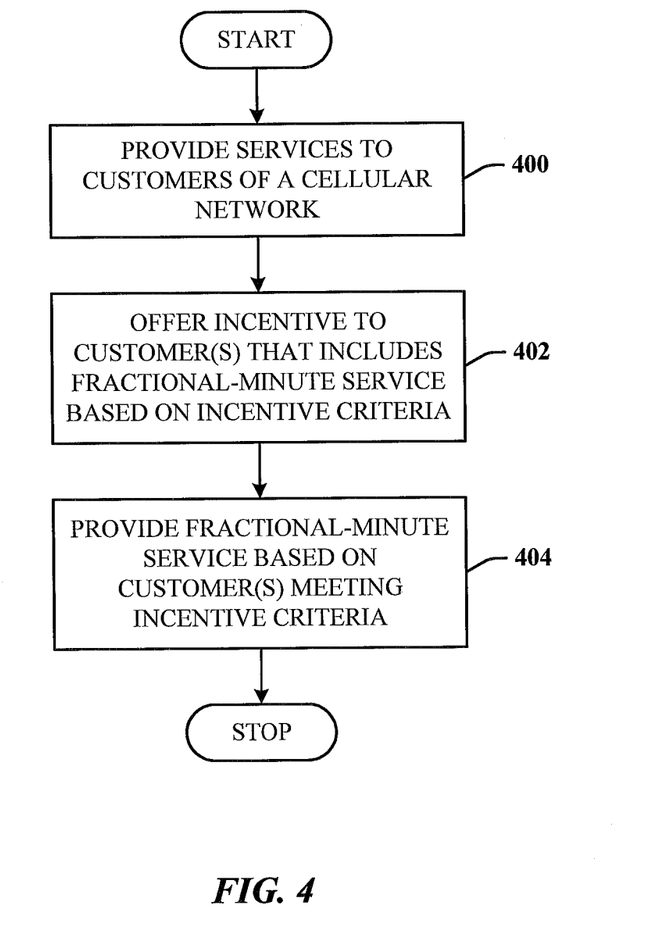
FIG. 4 illustrates a methodology of providing an incentive-based architecture of wireless providers.

FIG. 4 illustrates a methodology of providing an incentive-based architecture of wireless providers. It should be understood that the illustrated methods are not limited to the steps shown nor the order of the steps shown and are provided solely as a basis for teaching exemplary embodiments of the present invention. Accordingly, amendments to these methods and/or the addition, elimination, or combination of one or more steps may be made to achieve like results and still be within the scope of the present invention.

At 400, services are provided for customers of a cellular network. At 402, an incentive is offered that includes a fractional-minute service to the customers based on incentive criteria. At 404, the fractional-minute service is provided based on a customer meeting the incentive criteria.

Figure 5:
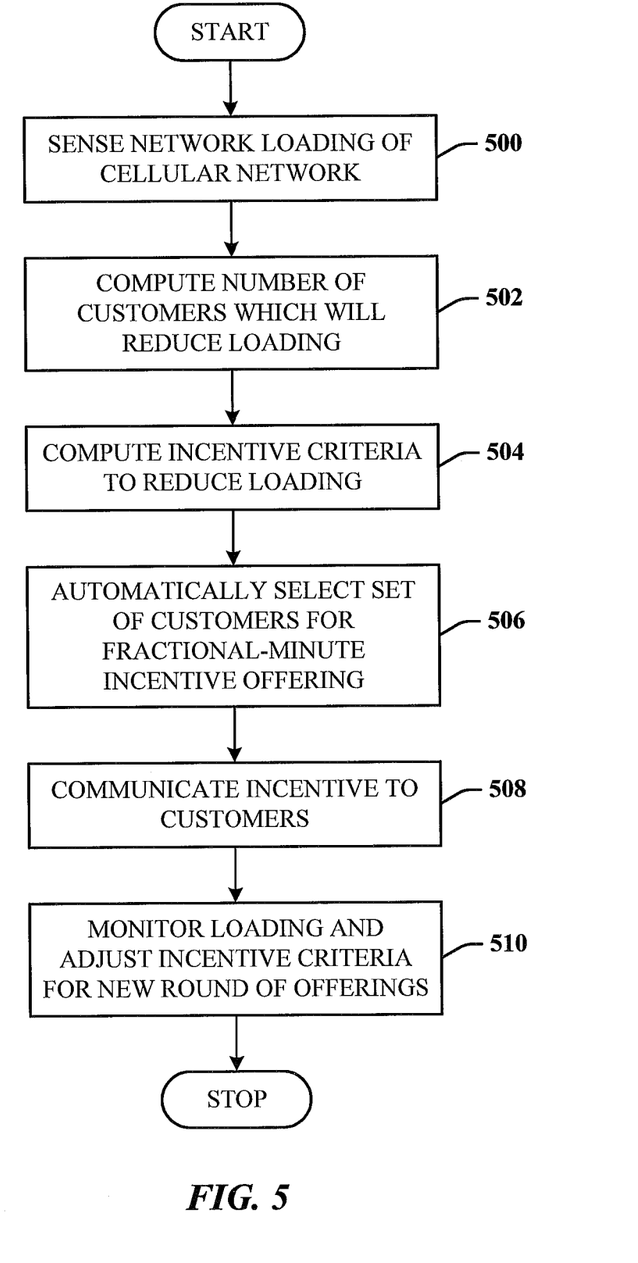
FIG. 5 illustrates a methodology of providing and monitoring incentive success based on network loading.

FIG. 5 illustrates a methodology of providing and monitoring incentive success based on network loading. At 500, network loading is sensed. At 502, the number of customers to which the incentive should be offered is computed. At 504, incentive criteria (e.g., duration, start time, end time, customers groups, customer categories, etc.) for reducing network loading are computed. At 506, a set of customers for fractional-minute incentive offering are automatically selected. The selection process can be based on the incentive criteria. For example, it the provider knows that certain customers only place calls at certain times of the day, this information can be used to select or not select those customers. At 508, the incentive offer is communicated to the selected customers. At 510, the system monitors the network loading and adjusts the incentive criteria for a new round of offerings. In other words, the loading problem can occur over an extended period of time. Under such conditions, the incentive criteria can be adjusted more "loosely" to allow more customers to benefit from the offer is the loading is not improving, or tightened up if the loading is improving.

Figure 6:
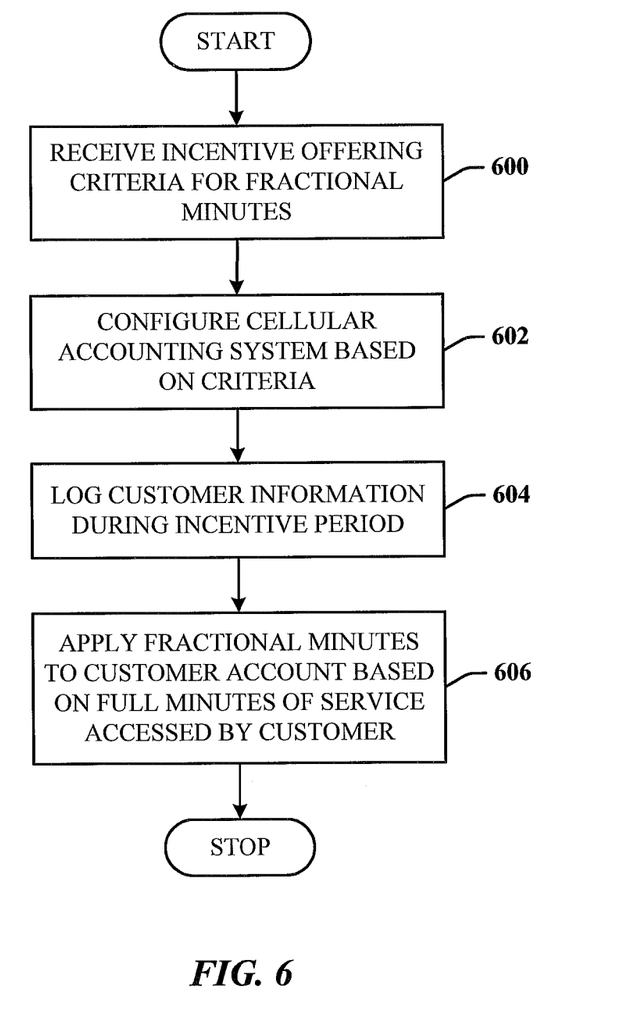
FIG. 6 illustrates a methodology of accounting for a fractional-minute incentive offering.

Referring now to FIG. 6, there is illustrated a methodology of accounting for a fractional-minute incentive offering. At 600, offering criteria for the incentive are received. At 602, the cellular accounting system is configured based on the criteria. At 604, customer information and activity information is logged during the incentive period. At 606, fractional minutes are applied to the customer account based on full minutes of service accessed by the customer during the period.

Figure 7:
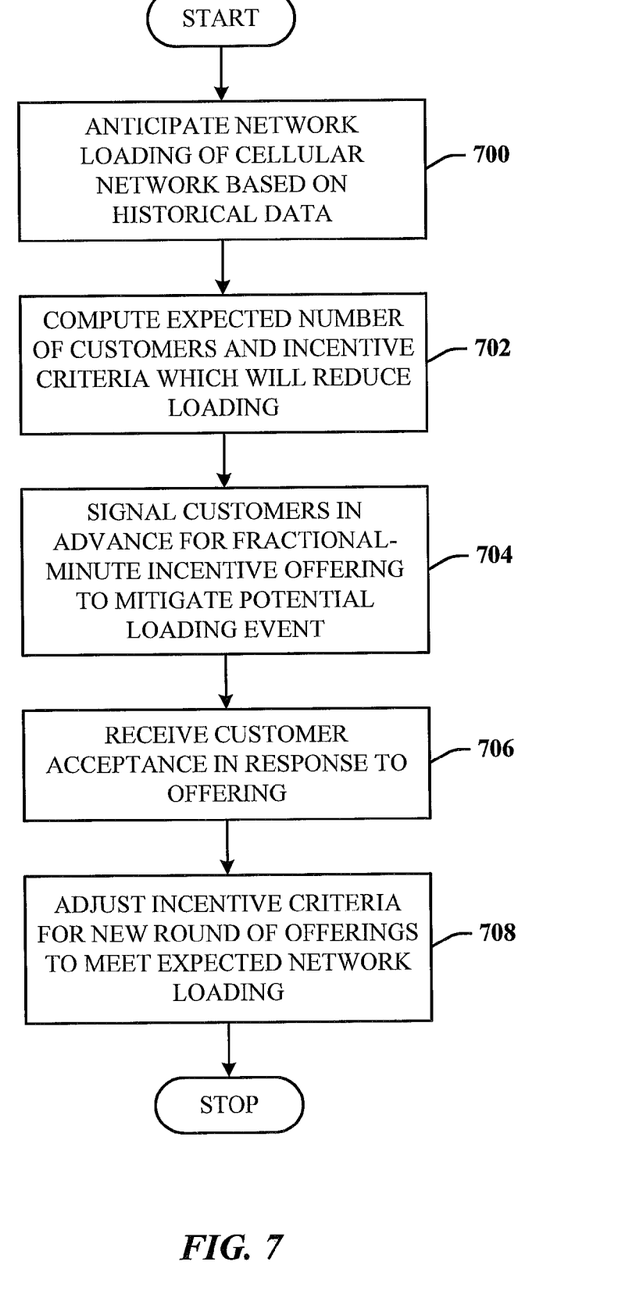
FIG. 7 illustrates a methodology of processing a fraction-minute incentive offering based on historical network loading patterns.

FIG. 7 illustrates a methodology of processing a fraction-minute incentive offering based on historical network loading patterns. At 700, network loading of the cellular network is anticipated based on historical data. At 702, the expected number of customers and incentive criteria which will reduce the loading is computed. At 704, customers are signaled in advance for the incentive offering to mitigate the expected loading event. At 706, customer acceptance is received back in response to the offering. At 708, incentive criteria is adjusted for a new round of offerings to meet expected loading based on number of customer acceptance received back.

As used in this application, the terms "component" and "system" are intended to refer to hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer or mobile terminal (cell phone).

Figure 8:
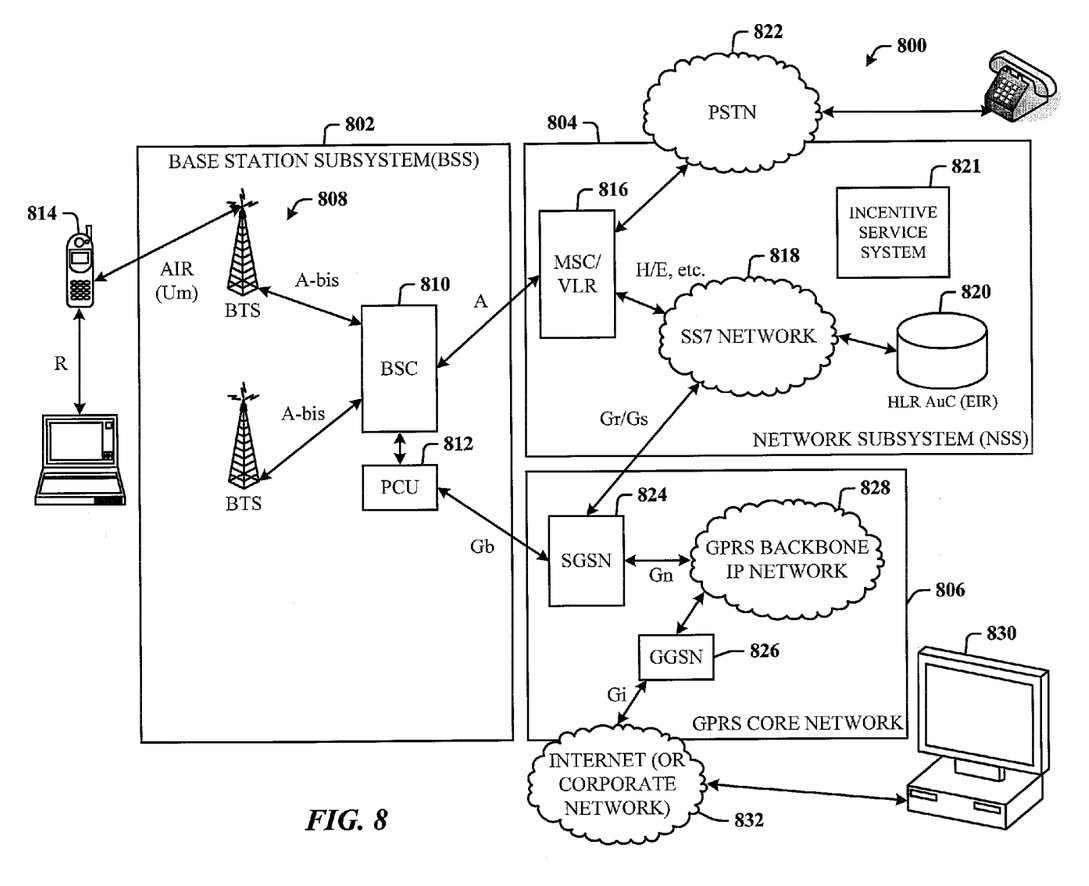
FIG. 8 illustrates an exemplary GSM network that facilitates incentive-based services according to an innovative aspect.

FIG. 8 illustrates an exemplary GSM network 800 that facilitates incentive-based services according to an innovative aspect. The GSM system, designed as a 2G cellular communications system, utilizes TDMA technology to enable greater call capacity. Digitally-encoded speech can also be ciphered to retain call privacy. Voice calls are the primary function of the GSM system. To achieve this, the speech is digitally encoded, and later decoded using a vocoder.

GSM also supports a variety of other data services, although the performance for such data services (e.g., facsimile videotext and teletext) is slow. One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 800 includes a base station subsystem (BSS) 802, a network subsystem (NSS) 804 and a GPRS core network 806. The BSS 802 can include one or more base transceiver stations (BTS) 808 and a base station controller (BSC) 810 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 812 is shown connected to the BTS 810 although the exact position of this can depend on the vendor architecture. The BSS 802 is connected by the air interface Um to a mobile terminal 814. The BTS 808 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorize the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 810 provides the intelligence behind the BTS 808. Typically, a BSC can have tens or even hundreds of BTSs 808 under its control. The BSC 810 handles allocation of radio channels, receives measurements from the mobile phones, and controls handovers from BTS to BTS (except in the case of an inter-MSC handover in which case control is in part the responsibility of the an MSC). One function of the BSC 810 is to act as a concentrator such that many different low capacity connections to the BTS 808 can become reduced to a smaller number of connections towards the MSC. Generally, this means that networks are often structured to have many BSCs 810 distributed into regions near the BTS 808 which are then connected to large centralized MSC sites.

The PCU 812 can perform some of the equivalent tasks of the BSC 810. The allocation of channels between voice and data can be controlled by the base station, but once a channel is allocated to the PCU 812, the PCU 812 takes full control over that channel. The PCU 812 can be built into the base station, built into the BSC, or even in some architectures, it can be at an SGSN site.

The BSS 802 connects to the NSS 804 by an A interface. The NSS 804 is shown containing an MSC 816 connected via an SS7 network 818 to an HLR 820. The AuC and the EIR, although technically separate functions from the HLR 820, are shown together since combining them can be performed in the network.

The incentive services system 821 that facilitate the fractional-minute incentive can be deployed in the NSS 804 and/or the core network 806. The system 821 can be embodied in a server in the cellular network to facilitate the disclosed incentive architecture. The server can process computer-executable instructions in combination with program modules and/or as a combination of hardware and software. Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

The combination of a cell phone 814 and a SIM card (not shown) creates a special digital "signature" that includes a subscriber number which is sent from the cell phone 814 to the nearest BTS 808 asking that the subscriber of a particular network be allowed to use the network. The request is passed on along the network of BTS 808 to the heart of a cellular network, the MSC 816. The MSC also routes all incoming and outgoing calls to and from the fixed-line networks or other cellular networks. When the user wants to make an outgoing call, another section of the MSC called the VLR checks whether the caller is actually allowed to make that call. For example, if the caller is barred for international dialing, a message to that effect will be generated by the VLR, sent along the network, and almost instantly back to the cell phone.

The NSS 804 also contains the component called HLR 820 that provides the administrative information required to authenticate, register and locate the caller as that network's subscriber. Once the HLR 820 has received a log-on request, the HLR 820 immediately checks the special "signature" contained in the request against the HLR special subscriber database. If the subscription is current, the MSC 816 sends a message back to the phone via the network of BTS 808 that indicates the caller is allowed to access the network. The name or code of that network will appear on the LCD screen of the cell phone 814. Once this network "name" message appears on the phone LCD screen, it means the caller is connected to the network and able to make and receive calls.

The HLR 820 registers which MSC the cell phone is currently connected to, so that when the network MSC 816 needs to route an incoming call to the cell phone number, it will first check the HLR 820 to see which MSC is currently serving the cell phone. Periodically, the cell phone will send a message to the MSC indicating where it is, in a process called polling. The combination of the tracking function and the caller's unique digital signature allows the MSC 816 to route that call to the precise base station the cell phone happens to be connected to, and then exclusively to the cell phone, even if a number of other subscribers are simultaneously connected to that base station.

When traveling to another MSC coverage are while driving, for example, the HLR 820 is automatically updated, and continues to monitor where exactly it should route the calls should the caller then move within range of another base station. This routing procedure means that out of hundreds of thousands of subscribers, only the correct cell phone will ring when necessary.

The NSS 804 has a direct connection to the PSTN 822 from the MSC 816. There is also a connection to from the NSS 804 to the GPRS core network 806 via a Gr/Gs interface although this is optional and not always implemented. The illustrated GPRS Core Network 806 is simplified to include a SGSN 824 (connected to the BSS 802 by the Gb interface) and a GGSN 826. The SGSN 824 and the GGSN 826 are connected together by a private IP network 828 called a GPRS backbone shown as the Gn reference point. A computer 830 is depicted as connecting to the core network 806 via an Internet or corporate network 832.

Some voice mail systems are linked to a network SMS Center (SMSC), a special facility that handles short messages. The SMSC generates the special SMS message that notifies the caller when they have mail waiting in a Mailbox. SMS messages can be received on an SMS-capable cell phone even while the caller is on a voice call. This is because the SMS messages are sent on a different radio frequency, the GSM data channel, than voice calls, so that the two never interfere.

Figure 9:
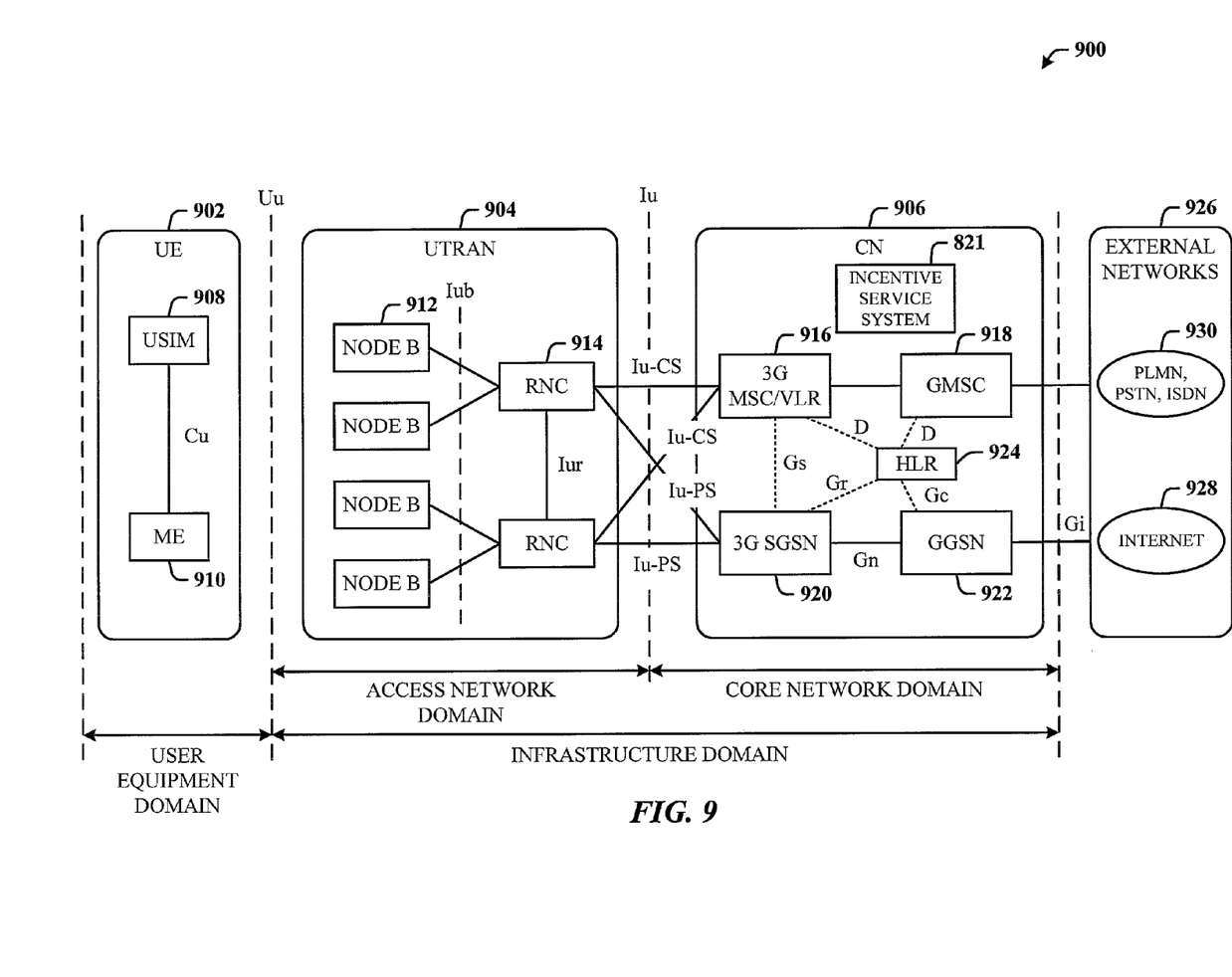
FIG. 9 illustrates an exemplary UMTS network that facilitates a fractional-minute incentive system in accordance with the subject innovation.

FIG. 9 illustrates an exemplary UMTS network 900 that facilitates a fractional-minute incentive system in accordance with the subject innovation. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The frequencies for UMTS deployment can include 1710-1770 MHz (uplink) and 2110-2170 (downlink) and 1885-2025 MHz (uplink) and 2110-2200 MHz (downlink). However, the innovative aspects described herein can also be applied to other frequency bands. UMTS can be used in other cellular/PCS frequencies, for example, 825-849 MI-Iz and 869-894 MHz, 1850-1910 MHz and 1930-1990 MHz. Bearer services can have different QoS (quality-of-service) parameters for maximum transfer delay, delay variation and bit error rate. Data rates include 144 kbps satellite and rural outdoor, 384 kbps urban outdoor, and 2048 kbps indoor and low range outdoor, for example.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 900 can include of three interacting domains; a user equipment (UE) domain 902, a UMTS Terrestrial Radio Access Network (UTRAN) domain 904, and a core network (CN) domain 906. The UTRAN domain 904 is also referred to as the access network domain and the CN 906 is referred to as the core network domain, the both of which comprise an infrastructure domain.

The UE domain 902 includes a USIM (universal subscriber identity module) domain and an ME (mobile equipment) domain. User equipment is the equipment used by the user to access UMTS services. In the UE domain 902, the UMTS IC card is the USIM 908 which has the same physical characteristics as GSM SIM (subscriber identity module) card. The USIM 908 interfaces to ME 910 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 904 provides the air interface access method for the UE domain 902. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 912, and control equipment for Node-B devices is called a radio network controller (RNC) 914. The interface between the Node-B device and the RNC 914 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for the UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a mobile services switching center (MSC) and visitor location register (VLR) 916 and gateway MSC (GMSC) 918. Packet-switched elements include a serving GPRS support node (SGSN) 920 and gateway GPRS support node (GGSN) 922. Some network elements such as an EIR (equipment identity register) (not shown), HLR (home location register) 924, VLR and AuC (authentication center) (not shown) can be shared by both domains. The core network 906 can also include the incentive services system 821 for proving a variety of incentive-based services as described herein.

A function of the CN 902 is to provide switching, routing and transit for user traffic. The CN 902 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 906 interfaces to the radio access domain via an Iu interface. An Iu-CS (circuit-switched) reference point interfaces an RNC of the access network to the MSC/VLR entity 916 of the CN 906 for voice from/to the MSC/VLR 916. An Iu-PS (packet-switched) reference point interfaces an RNC of the access network to the SGSN entity 920 of the CN 906 for data from/to the SGSN 920.

In the CN 906, a Gs interface is provided between the MSC/VLR 916 and the SGSN. A Gn interface is provided between the SGSN 920 and the GGSN 922. A D interface is provided between the MSC/VLR 916 and the HLR 924, and the HLR 924 and the GMSC 918. A Gr interface is provided between the SGSN 920 and the HLR 924. A Ge interface is provided between the GGSN 922 and the HLR 924.

The CN 906 provides the interface from the UE domain 902 to external networks 926 such as the Internet 928 via a Gi interface from the GGSN 922, and other networks 930 via the GMSC 918, which can include a PLMN (public land mobile network), PSTN (public switched telephone network) and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 906 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz can be utilized for TDD and TD/CDMA. Unpaired channel spacing can be 5 MHz and raster is 200 kHz. Transmit and receive are not separated in frequency. Frequencies such as 1980-2010 MHz and 2170-2200 MHz can be employed for satellite uplink and downlink.

The disclosed invention finds application to EDGE (Enhanced Data rates for GSM Evolution) technology. EDGE is effectively the final stage in the evolution of the GSM standard, and uses a new modulation schema to enable theoretical data speeds of up to 384 Kbps within the existing GSM spectrum. EDGE is an alternative upgrade path towards 3G services for operators, without access to a new spectrum.

The architecture of the invention also finds application to a hierarchical cell structure (HCS). HCS is the architecture of a multi-layered cellular network where subscribers are handed over from a macrocell to a microcell, and even further, to a picocell, depending on the current network capacity and the needs of the subscriber.

The law does not require and it is economically prohibitive to illustrate and teach every possible embodiment of the present claims Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a computer-readable memory, in communication with the processor, having stored therein computer-executable instructions, which, when executed by the processor, cause the processor to perform operations comprising:
maintaining multiple tiers of customers including a higher tier of customers and a lower tier of customers;
determining, in a first determination, that a particular load characteristic for a network exists;
offering, in response to the first determination, and to only the customers of the higher tier of multiple tiers, an incentive, involving a discount for use of a service via the network, in advance of offering the incentive to customers of the lower tier of the multiple tiers in connection with the particular load characteristic;
starting a timer measuring time elapsed since offering the incentive to only the customers of the higher tier;
receiving, from some of the customers of the higher tier, responses indicating acceptance of the incentive offered;
determining that the time elapsed has reached a predetermined amount of time;
determining, in a second determination, subsequent to offering the incentive only to the customers of the higher tier, and based on the responses received from customers of the higher tier, whether a sufficient number of the customers of the higher tier have, within the predetermined amount of time, accepted the incentive offered in connection with the particular load characteristic; and
offering, only in response to the first determination and a negative result in the second determination, the incentive to the customers of the lower tier in connection with the particular load characteristic.

2. The system of claim 1, wherein the sufficient number is based on an anticipated load on the network.

3. The system of claim 1, wherein the sufficient number is based on a determined load on the network.

4. The system of claim 1, wherein the operation of offering the incentive to the customers of the higher tier in advance of offering the incentive to the customers of the lower tier comprises:
offering the incentive to the customers of the higher tier in connection with a first pre-determined time window; and
offering the incentive to the customers of the lower tier in connection with a second pre-determined time window that is not identical to the first pre-determined time window.

5. The system of claim 1, wherein the operation of offering the incentive to the customers comprises:
offering the incentive to the customers so that the customers can accept the offer on a non-binding basis; and
receiving and processing non-binding acceptances received from the customers in response to the offer.

6. The system of claim 1, wherein the particular load characteristic relates to an anticipated load on the network.

7. The system of claim 1, wherein the particular load characteristic relates to a determined load on the network.

8. A method, comprising:
maintaining, by a system using a computing processor, multiple tiers of customers including a higher tier of customers and a lower tier of customers;
determining, by the system, in a first determination, that a particular load characteristic for a network exists;
offering, by the system, in response to the first determination, and to only the customers of the higher tier of multiple tiers, an incentive, involving a discount for use of a service via the network, in advance of offering the incentive to customers of the lower tier of the multiple tiers in connection with the particular load characteristic;
starting, by the system, a timer measuring time elapsed since offering the incentive to only the customers of the higher tier;
receiving, by the system, from some of the customers of the higher tier, responses indicating acceptance of the incentive offered;
determining, by the system, that the time elapsed has reached a predetermined amount of time;
determining, by the system, in a second determination, subsequent to offering the incentive only to the customers of the higher tier, and based on the responses received from customers of the higher tier, whether a sufficient number of the customers of the higher tier have, within the predetermined amount of time, accepted the incentive offered in connection with the particular load characteristic; and
offering, by the system, only in response to the first determination and a negative result in the second determination, the incentive to the customers of the lower tier in connection with the particular load characteristic.

9. The method of claim 8, wherein the sufficient number is based on an anticipated load on the network.

10. The method of claim 8, wherein the sufficient number is based on a determined load on the network.

11. The method of claim 8, wherein offering the incentive to the customers of the higher tier in advance of offering the incentive to the customers of the lower tier comprises:
offering the incentive to the customers of the higher tier in connection with a first pre-determined time window; and
offering the incentive to the customers of the lower tier in connection with a second pre-determined time window that is not identical to the first pre-determined time window.

12. The method of claim 8, wherein offering the incentive to the customers comprises:
offering the incentive to the customers so that the customers can accept the offer on a non-binding basis; and
receiving and process non-binding acceptances received from the customers in response to the offer.

13. The method of claim 8, wherein the particular load characteristic relates to an anticipated load on the network.

14. The method of claim 8, wherein the particular load characteristic relates to a determined load on the network.

15. A tangible computer-readable storage device having stored therein computer-executable instructions, which, when executed by a processor, cause the processor to perform a method comprising:
maintaining multiple tiers of customers including a higher tier of customers and a lower tier of customers;
determining, in a first determination, that a load characteristic for a network exists;
offering, in response to the first determination, and to only the customers of the higher tier of multiple tiers, an incentive, involving a discount for use of a service via the network, in advance of offering the incentive to customers of the lower tier of the multiple tiers in connection with the load characteristic;
starting a timer measuring time elapsed since offering the incentive to only the customers of the higher tier;
receiving, from some of the customers of the higher tier, responses indicating acceptance of the incentive offered;
determining that the time elapsed has reached a predetermined amount of time;
determining, in a second determination, subsequent to offering the incentive only to the customers of the higher tier, and based on the responses received from customers of the higher tier, whether a sufficient number of the customers of the higher tier have, within the predetermined amount of time, accepted the incentive offered in connection with the load characteristic; and
offering, only in response to the first determination and a negative result in the second determination, the incentive to the customers of the lower tier in connection with the load characteristic.

16. The tangible computer-readable storage device of claim 15, wherein the sufficient number is based on an anticipated load on the network.

17. The tangible computer-readable storage device of claim 15, wherein the operation of offering the incentive to the customers of the higher tier in advance of offering the incentive to the customers of the lower tier comprises:
offering the incentive to the customers of the higher tier in connection with a first pre-determined time window; and
offering the incentive to the customers of the lower tier in connection with a second pre-determined time window that is not identical to the first pre-determined time window.

18. The tangible computer-readable storage device of claim 15, wherein the load characteristic relates to an anticipated load on the network.

* * * * *